(12) United States Patent
Fowler

(10) Patent No.: US 8,251,331 B2
(45) Date of Patent: Aug. 28, 2012

(54) ARTICLE HOLDER ADAPTED FOR BEING SUPPORTED BY A FENCE

(76) Inventor: Robert B Fowler, Bennettsville, SC (US)

( * ) Notice: Subject to any disclaimer, the term of this patent is extended or adjusted under 35 U.S.C. 154(b) by 0 days.

(21) Appl. No.: 12/927,862

(22) Filed: Nov. 29, 2010

(65) Prior Publication Data

US 2012/0132766 A1    May 31, 2012

(51) Int. Cl.
*A47F 5/00* (2006.01)
(52) U.S. Cl. .................. 248/316.8; 248/214; 248/229.1; 248/339; 248/304; 248/305; 248/316.7; 248/215
(58) Field of Classification Search .................. 248/214, 248/229.1, 339, 340, 304, 305, 316.8, 316.7, 248/220.21, 225.21, 215, 229.16, 301
See application file for complete search history.

(56) References Cited

U.S. PATENT DOCUMENTS

| | | | | |
|---|---|---|---|---|
| 345,020 A * | 7/1886 | Barney | | 248/214 |
| 371,665 A * | 10/1887 | Brinkerhoff | | 248/489 |
| 682,969 A * | 9/1901 | Blackburn | | 248/205.1 |
| 1,067,937 A * | 7/1913 | Neumann | | 248/214 |
| 1,219,354 A * | 3/1917 | Seward | | 248/214 |
| 1,888,723 A * | 11/1932 | Gould | | 248/214 |
| 2,206,328 A * | 7/1940 | Martinek | | 294/85 |
| 3,208,704 A * | 9/1965 | McDowell | | 248/68.1 |
| 4,117,629 A * | 10/1978 | Ekdahl | | 47/67 |
| 4,138,019 A * | 2/1979 | Smith | | 211/87.01 |
| 5,457,911 A * | 10/1995 | Vollink | | 47/67 |
| 5,485,932 A * | 1/1996 | Romm et al. | | 211/87.01 |
| 6,659,412 B1 * | 12/2003 | Roach | | 248/215 |
| 7,506,849 B1 * | 3/2009 | Koster et al. | | 248/214 |
| 7,694,925 B2 * | 4/2010 | Kokenge et al. | | 248/220.42 |
| 7,845,604 B2 * | 12/2010 | Connor, Jr. | | 248/215 |

* cited by examiner

*Primary Examiner* — Nkeisha Smith
(74) *Attorney, Agent, or Firm* — James Curley

(57) ABSTRACT

A fence hanger apparatus is generally comprised of two vertical hanging support brackets. The two vertical hanging support brackets each have an upper portion terminating in a U-shaped hook for hanging the apparatus over the top rail of a fence, and a lower portion. A vertical member has an upper end and a lower end and is positioned approximately midway between the two vertical hanging support brackets and is substantially parallel to the upper portions of the two vertical hanging brackets. The upper end of the vertical member extends substantially to the same height as the U-shaped hooks. The vertical member has a front face, a rear face and two side faces. The front face of the vertical member is provided with means for attaching hanging members. A U-shaped latch is pivotally mounted to the lower end of the vertical member for attaching the apparatus to a vertical post of a fence. The lower portions of the two hanging support brackets are secured to the lower end of the vertical member with securing means.

14 Claims, 3 Drawing Sheets

ARTICLE HOLDER ADAPTED FOR BEING SUPPORTED BY A FENCE

FIELD OF THE INVENTION

The invention relates to an apparatus for holding articles and more particularly to an apparatus which hangs from a fence and hold articles.

BACKGROUND OF THE INVENTION

Safe, orderly, and convenient storage of outdoor equipment, for example ladders and garden hoses and the like, is sometimes difficult to find. Fences can provide real estate to hang such items. Often also, fences provide a suitable structure on which to display or hang potted plants. Hangers for storing articles are particularly designed for chain-link style fences because of the popularity of chain-link fences and because the chain-link fence provide numerous options for hangers to be supported.

See for example U.S. Pat. No. 4,953,817, incorporated herein by reference, which teaches a hanger, particularly adapted to connect or attach items to a chain link fence, includes a central hub portion which is preferably spherically shaped and three arms which extend outwardly therefrom. Two of the arms extend to the sides and are bent rearwardly terminating in ball-shaped cams. The third arm extends upwardly and has its free end bent forwardly and also terminating in a ball. The hanger is attached to a fence by feeding the end of the third leg under one of the diagonally extending fence wires and then snapping the balls at the ends of the other two arms around the outer edges of the two spaced apart fence wires that are perpendicular to the first wire. With the hanger in place, a variety of different articles can be suspended from a hook or other type of support mounted on the central hub portion.

However, the U.S. Pat. No. 4,953,817 hanger relies on the chain links for support, and thus heavier objects can not effectively be stored by these hangers.

Another example of a hanger designed for use with chain link fences is taught in U.S. Pat. No. 5,457,911, incorporated herein by reference. Like the '817 patent, the U.S. Pat. No. 5,457,911 hanger relies on the chain links themselves for mechanical support, and thus is not useful to hang heavier objects.

U.S. Pat. No. 6,659,412, incorporated herein by reference, relies on the top rail of a fence, including chain link fences for support of an article holder. In particular, the U.S. Pat. No. 6,659,412 teaches a wood or plastic base or back structure that is hung from the top rail of the fence by two large rafter-type hooks. A ladder hook is then mounted to the face of the base or back structure to support the ladder. Other applications are envisioned as well such as hanging hoses, potted plants, gardening tools and supplies, pool tools or toys, and the like.

However, the article holder of the '412 patent is a relatively complicated structure, may itself be heavy if constructed of wood, and does not provide any allowance for engaging vertical posts on the fence, which would provide greater stability. While the article holder of the '412 patent can support items other than ladders by way of the ladder hook, some items are more suited to be held by structures other than a ladder hook, and this is not provided for.

It is an object of the present invention to provide an apparatus supported on a fence for holding articles, which is light-weight, can be easily adapted to support a variety of objects with a variety of hanging mechanisms, and is of simple construction.

BRIEF DESCRIPTION OF THE INVENTION

The objects described hereinbefore are satisfied with the present invention. The improved fence hanger apparatus is comprised of three main components: a pair of brackets to secure the apparatus to the top rail of a fence, a support member which can accommodate a variety of items to hang, and a latch to secure the apparatus to a vertical post of the fence. These components are joined together mechanically and result in a 3-point design having greater stability and more varied applications than taught in the prior art.

The fence hanger apparatus of the present invention is generally comprised of two vertical hanging support brackets. The two vertical hanging support brackets each have an upper portion terminating in a U-shaped hook for hanging the apparatus over the top rail of a fence, and a lower portion. A vertical member has an upper end and a lower end and is positioned approximately midway between the two vertical hanging support brackets and is substantially parallel to the upper portions of the two vertical hanging brackets. The upper end of the vertical member extends substantially to the same height as the U-shaped hooks. The vertical member has a front face, a rear face and two side faces. The front face of the vertical member is provided with means for attaching hanging members. A U-shaped latch is pivotally mounted to the lower end of the vertical member for attaching the apparatus to a vertical post of a fence. The lower portions of the two hanging support brackets are secured to the lower end of the vertical member with securing means.

Preferably, the means for attaching hanging members comprise threaded holes for receiving bolts, hooks, slots, combinations thereof and the like.

Preferably the two hanging support brackets are each provided with at least one hole for receiving a rod. The vertical member is provided with at least one hole for receiving a rod. The securing means for securing the two hanging support brackets to the vertical member is comprised of at least one threaded rod extending from the hole on one of the hanging support brackets, through hole in the vertical member, through the hole on the second hanging support bracket, and being secured to the hanging support brackets and the vertical member with nuts.

Of course other arrangements and securing means are possible. As just one example, if the components are metal, a metal rod can extend from one of the hanging support brackets to the second hanging support bracket and contacting the vertical member. The rod may be welded to the hanging support brackets and the vertical member.

In alternative to the providing a rod to secure the vertical member to the hanging support brackets, such rod providing a strength and stiffness to the apparatus, means to permanently affix the U-shaped hooks on the top rail of a fence and means to permanently affix the U-shaped latch to the vertical post of a fence may be provided. Such means to permanently affix the U-shaped hooks on the top rail of a fence and the means to affix the U-shaped latch to the vertical post of a fence are selected from: clamping means provided at the end of the U-shaped hook, a strap provided at the end of the U-shaped hook, and combinations thereof.

In another preferred embodiment, the U-shaped hooks and the U-shaped latch are made of a resilient material, and wherein the U-shaped hooks and the U-shaped latch are slightly smaller than the fence rail and post around which the U-shaped hooks hang and the U-shaped latch hook, thereby holding the apparatus tightly to the fence.

In a preferred embodiment in accordance with the present invention, an apparatus is provided which is designed to hold outdoor items such as hoses, planters, ladders, and the like to fences. The apparatus is provided with two vertical hanging support brackets. The two vertical hanging support brackets each have an upper portion terminating in a U-shaped hook for hanging the apparatus over the top rail of a fence, and a lower portion. The upper portions of the two vertical hanging support brackets are substantially parallel to each other. The lower portions of the two vertical hanging support brackets angle towards each other, terminating closely adjacent to each other. A vertical member has an upper end and a lower end and is positioned approximately midway between the two vertical hanging support brackets and is substantially parallel to the upper portions of the two vertical hanging brackets. The upper end of the vertical member extends substantially to the same height as the U-shaped hooks. The lower end of the vertical member terminates between the lower portions of the two vertical hanging brackets. The vertical member has a front face, a rear face and two side faces. The lower portions of the two hanging support brackets are secured to the lower end of the vertical member on the vertical member's side faces with securing means. The front face of the vertical member is provided with means for attaching hanging members. A U-shaped latch is pivotally mounted at the lower end of the vertical member and extending from the rear face of the vertical member. A rod extends from the parallel portion of one of the vertical hanging support brackets to the parallel portion of the second vertical hanging support bracket, passing through the vertical member, the rod extending substantially perpendicular to the parallel portions of the two vertical hanging support brackets and the vertical member. The rod is secured to the two vertical hanging support brackets and to the vertical member with securing means.

The two vertical hanging support brackets are conveniently made of flat metal material such as aluminum or steel strap with a width of ½ inches to 2.0 inches and a thickness of 1/16 inch to ¼ inch, although other dimensions and materials are possible. If metal is used, preferably the metal is coated to prevent rust. Many varieties of hard plastic may be employed; however a metal support bracket is preferred for strength and durability.

The U-shaped hooks may further include a securing means to attach the vertical hanging support brackets in a permanent arrangement to the top rail of the fence. For example, the U-shaped hooks could include a clamping portion to completely encircle the top rail of the fence and lock. In another example, the U-shaped hooks could include a strap which encircles the top rail of the fence.

The vertical member is preferably metal. The front face is provided with means for attaching hanger members. These means include threaded holes for bolts, slots for receiving hangers, hooks, combinations thereof, and the like.

The lower end of the vertical member is provided with means to pivotally mount the U-shaped latch. Preferably, the vertical member is provided with more than one location on the lower end on which the U-shaped latch may be pivotally mounted, whereby the U-shaped latch may be positioned appropriately for different fences.

The rod is most preferably a threaded metal rod. The rod is secured to the two vertical hanging support brackets and the vertical member with securing means. Most preferably the two vertical hanging support brackets and the vertical member have holes through which the rod can pass, and the rod is secured to the vertical hanging support brackets and the vertical member by one or more nuts threaded on the rod. Alternatively, the rod can be welded to the two hanging support brackets and the vertical member.

The entire apparatus may be cast in metal, plastic or other substantial weather-retarding material.

The lower portions of the two hanging support brackets are secured to the lower end of the vertical member on the vertical member's side faces with securing means. Such securing means conveniently comprise, the two hanging support brackets having holes in their lower portions and the vertical member also having a hole therethrough, such that the hole coincide and a bolt can be passed through and secured with a nut. One skilled in the art will appreciate this is just one possibility in securing the vertical member to the two hanging support brackets.

Most preferably, the support brackets and all the components of the apparatus will be of similar construction materials (if metal) or appearance as the fence the apparatus is hanging on, making the fence hanger apparatus of the present invention have a low visual profile, that is the fence hanger apparatus blends in with the fence itself.

The apparatus supported on a fence for holding articles of the present invention is particularly useful when supported by chain link fences, although the invention is not limited to this application. When used with a chain link fence, the U-shaped hooks on the upper portion of the two vertical hanging support brackets are sized to fit snugly over the top rail of the chain link fence. The U-shaped pivotally mounted latch on the lower end of the vertical member is sized to fit snugly around the vertical rail on a chain link fence.

If the apparatus of the present invention is used in conjunction with fences of styles other than chain link, the U-shaped hooks and U-shaped latch would be sized and shaped appropriate to the top rail and vertical rail of the fence respectively.

The fence hanger apparatus of the present invention is easily adapted to support a variety of objects with a variety of hanging mechanisms. As described hereinbefore, the vertical member is provided with a variety of means of attaching hanging members. Thus, for instance a commercially available garden hose rack which is designed to be bolted to a wall or house can conveniently be bolted to the fence hanger apparatus which provided with at least on threaded hole on the front face of the vertical member.

In another example, the front face of the vertical member is provided with at least one slot such that a hanger members fitted with tabs can be inserted therein. Potted plants, flags, bird feeders, solar lights, decorations and the like can be attached or suspended from the hanger members. Preferably the hanger members are removable so that one fence hanger apparatus may have multiple uses.

Most preferably, the front face of the vertical member is provided with multiple slots, such that more than one hanger member provided with tabs can be inserted therein. Thus, more than one item may be suspended from a single fence hanger apparatus.

In further examples, hanger members may be attached to the front face of the vertical member by rivets, welding, or the hanger member may be cast with the vertical member.

By combining more than one fence hanger apparatus of the present invention along the length of a fence, ladders, privacy curtains, clothes lines and like can be hung via lines or pipes attached to hanger members on each fence hanger apparatus.

BRIEF DESCRIPTION OF THE DRAWINGS

Further features and advantages will be more apparent from the detailed description of some preferred but nonexclusive embodiments of the fence hanger apparatus according to the present invention. Such a description will be set forth hereinafter with reference to the accompanying drawings, given only for illustrative and thus non-limiting purposes, in which.

DETAILED DESCRIPTION OF THE DRAWINGS

Figure 1:
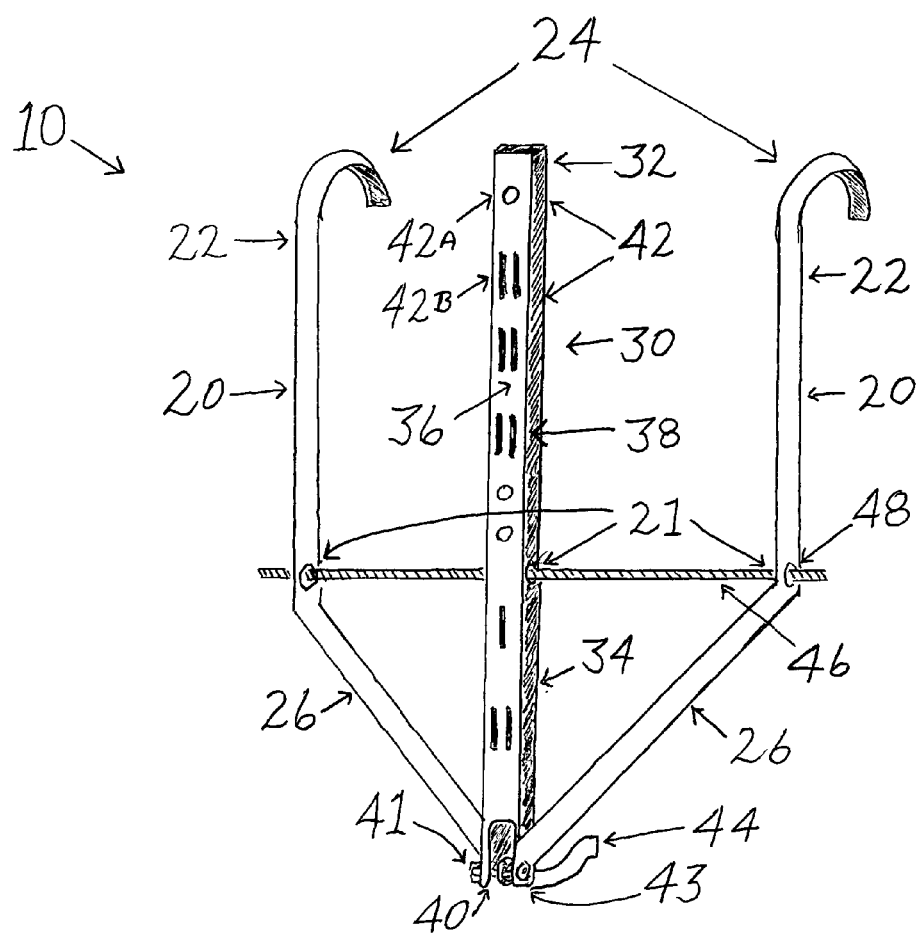
FIG. 1 is a perspective view of one embodiment of the present invention.

The present invention will now be described more fully hereinafter with reference to the accompanying drawings in which preferred embodiments of the invention are shown. This invention however may be embodied in many different forms and should not be construed as limited to the embodiments set forth herein. In the drawings, like numbers refer to like elements throughout.

Referring now to FIG. 1, the fence hanger apparatus of the present invention (10) is provided with two vertical hanging support brackets (20). The two vertical hanging support brackets have an upper portion (22) terminating in the U-shaped hook (24) for hanging the apparatus over the top rail of a fence, and a lower portion (26). The upper portions (22) of the two vertical hanging support brackets (20) are substantially parallel to each other. The lower portions (26) of the two vertical hanging support brackets (20) angle towards each other, terminating closely adjacent to each other. A vertical member (30) has an upper end (32) and a lower end (34) and is positioned approximately midway between the two vertical hanging support brackets (20) and is substantially parallel to the upper portions (22) of the two vertical hanging brackets (20). The upper end (32) of the vertical member (30) extends substantially to the same height as the U-shaped hooks (24). The lower end (34) of the vertical member (30) terminates between the lower portions (26) of the two vertical hanging brackets (20). The vertical member (30) has a front face (36), a rear face (not shown) and two side faces (38). The lower portions (26) of the two hanging support brackets (20) are secured to the lower end (34) of the vertical member (30) on the vertical member's side faces (38) with securing means (40). The front face (36) of the vertical member (30) is provided with means for attaching hanging members (42). A U-shaped latch (44) is pivotally mounted at the lower end (34) of the vertical member (30). A rod (46) extends from the upper portion (22) of one of the vertical hanging support brackets (20) to the upper portion (22) of the second vertical hanging support bracket (20), passing through the vertical member (30), the rod (46) extending substantially perpendicular to the upper portions (22) of the two vertical hanging support brackets (20) and the vertical member (30). The rod (46) is secured to the two vertical hanging support brackets (20) and to the vertical member (30) with securing means (48).

The rod (46) is most preferably a threaded metal rod. The rod (46) is secured to the two vertical hanging support brackets (20) and the vertical member (30) with securing means (48). Most preferably the two vertical hanging support brackets (20) and the vertical member (30) have holes (21) through which the rod (46) can pass, the securing means (48) being one or more nuts (48) threaded onto the rod on either side of the vertical hanging support brackets (20) and on either side of the vertical member (30).

The securing means (40) which secure the lower portions (26) of the two hanging support brackets (20) to the lower end (34) of the vertical member (30) may be a bolt (41) and nut (43); the bolt (41) passes through the lower portions (26) of the hanging support brackets (20) and through the side faces of the vertical member (30). The nut (43) secures the bolt (41). Other securing means will be apparent to those skilled in the art.

Conveniently, and as shown in the Figure, the U-shaped latch (44) pivotally mounted at the lower end (34) of the vertical member (30) can be mounted employing the same bolt (41) that secures the lower portions (26) to each other and to the vertical member (30).

The means for attaching hanging members (42) may include one or more include threaded holes to receive bolts (42A), slots (42B) for receiving hangers and other means which will be apparent to those skilled in the art.

Figure 2:
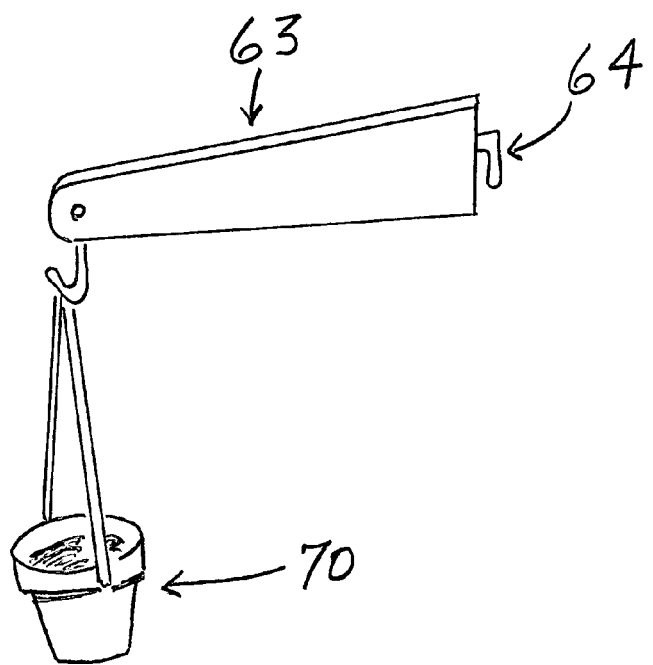
FIG. 2 illustrates a hanger member with tabs to mount on the vertical member of the apparatus of the present invention of FIG. 1.

In FIG. 2, a hanging member (63) for holding a potted plant (70) is provided with at least one tab (64) for being received into the slots (42B) on the vertical member (30) of the article holder (10) of FIG. 1.

Figure 3:
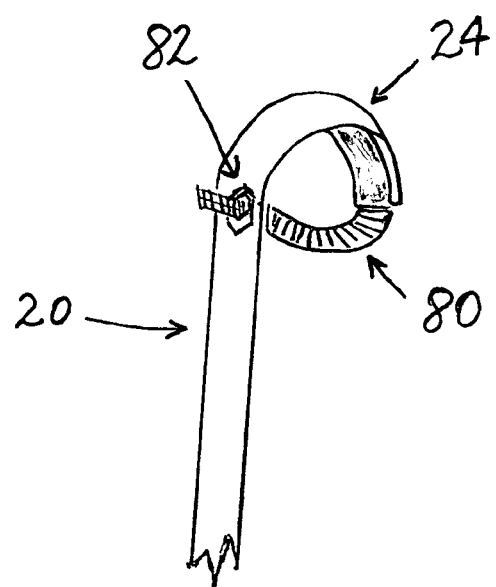
FIG. 3 illustrates one of the U-shaped hooks with a means to permanently affix the apparatus to a fence rail according to the present invention.

In FIG. 3, one of the U-shaped hooks (24) on the hanging support bracket (20) is shown with means to permanently affix the U-shaped hook (24) to a fence rail. Shown is a strap (80) provided at the end of the U-shaped hook (24). The U-shaped hook (24) is provided with a hole (82) through which the strap (80) can pass through, thereby securing the U-shaped hook (24) and thus the apparatus, more securely to the fence rail. As noted hereinbefore, this is just one alternative to more securely or permanently affix the apparatus to the fence. The same methods can be used in conjunction with the U-shaped latch to more securely affix the U-shaped latch to the fence post.

One skilled in the art can appreciate that there are numerous embodiments to provide a 3-point fence hanger apparatus in accordance with the present invention. For example, the two vertical hanging support brackets can be comprised of one continuous piece, with each end having a U-shaped hook. Other modifications and embodiments of the present invention are possible. It is to be understood that the invention is not limited to the embodiments shown and described herein.

I claim:

1. An apparatus supported by a fence for holding articles comprised of:
two vertical hanging support brackets, each of the two vertical hanging support brackets having an upper portion terminating in a U-shaped hook for hanging the apparatus over a top rail of a fence, and a lower portion;
a vertical member having an upper end and a lower end and being positioned approximately midway between the two vertical hanging support brackets, and being substantially parallel to the upper portions of the two vertical hanging brackets, the upper end of the vertical member extending substantially to a same height as the U-shaped hooks, the vertical member having a front face, a rear face and two side faces, the front face of the vertical member being provided with means for attaching hanging members;
a U-shaped latch pivotally mounted to the lower end of the vertical member, extending from the rear face of the vertical member for attaching the apparatus to a vertical post of a fence;

the lower portions of the two hanging support brackets being secured to the lower end of the vertical member with securing means.

2. The apparatus of claim 1, wherein the means for attaching hanging members is comprised of slots to receive tabs, threaded holes to receive bolts, hooks, and combinations thereof.

3. The apparatus of claim 1,
wherein the two hanging support brackets are each provided with at least one hole for receiving a rod;
wherein the vertical member is provided with at least one hole for receiving a rod;
and wherein the securing means for securing the two hanging support brackets to the vertical member is comprised of at least one threaded rod extending from the hole on one of the hanging support brackets, through hole in the vertical member, through the hole on the second hanging support bracket, and being secured to the hanging support brackets and the vertical member with nuts threaded on the threaded rod.

4. The apparatus of claim 1, wherein the two hanging support brackets and the vertical member are metal, and wherein the securing means for securing the two hanging support brackets to the vertical member is comprised of at least one metal rod extending from one hanging support bracket to the second hanging support bracket and contacting the vertical member, wherein the rod is welded to the hanging support brackets and the vertical member.

5. The apparatus of claim 1, further comprising means to permanently affix the U-shaped hooks on the top rail of a fence and means to permanently affix the U-shaped latch to the vertical post of a fence.

6. The apparatus of claim 5, wherein the means to permanently affix the U-shaped hooks on the top rail of a fence and the means to affix the U-shaped latch to the vertical post of a fence are selected from: clamping means provided at an end of the U-shaped hook, a strap provided at an end of the U-shaped hook, and combinations thereof.

7. The apparatus of claim 1, wherein the U-shaped hooks and the U-shaped latch are made of a resilient material, and wherein the U-shaped hooks and the U-shaped latch are slightly smaller than the fence rail and post around which the U-shaped hooks hang and the U-shaped latch hook, thereby holding the apparatus tightly to the fence.

8. An apparatus supported by a fence for holding articles comprised of
two vertical hanging support brackets, each of the two vertical hanging brackets having an upper portion and a lower portion, each upper portion terminates in a U-shaped hook for hanging the apparatus over a top rail of a fence, the upper portions of the two vertical hanging support brackets are substantially parallel to each other, the lower portions of the two vertical hanging support brackets angle towards each other, terminating closely adjacent to each other;
a vertical member having an upper end and a lower end and being positioned approximately midway between and substantially parallel to the two vertical hanging support brackets, the upper end of the vertical member extending substantially to a same height as the U-shaped hooks, the lower end of the vertical member terminating between the lower portions of the two vertical hanging brackets, the vertical member having a front face, a rear face and two side faces;
the lower portions of the two hanging support brackets being secured to the lower end of the vertical member on the vertical member's side faces with securing means;
the front face of the vertical member being provided with means for attaching hanging members;
a U-shaped latch pivotally mounted at the lower end of the vertical member; and
a rod extending from the upper portion of one of the vertical hanging support brackets to the upper portion of the second vertical hanging support bracket, passing through the vertical member, the rod extending substantially perpendicular to the upper portions of the two vertical hanging support brackets and the vertical member, the rod being secured to the two vertical hanging support brackets and to the vertical member with securing means.

9. The apparatus of claim 8, wherein the means for attaching hanging members comprised of slots to receive tabs, threaded holes to receive bolts, hooks, and combinations thereof.

10. The apparatus of claim 8, wherein the two vertical hanging support brackets are metal, the vertical member is metal.

11. The apparatus of claim 9, further comprising at least one hanging member provided with tabs, the tabs being received into the slots provided on the front face of the vertical member.

12. The apparatus of claim 8, further comprising means to permanently affix the U-shaped hooks on the top rail of a fence and means to permanently affix the U-shaped latch to a vertical post of a fence.

13. The apparatus of claim 12, wherein the means to permanently affix the U-shaped hooks on the top rail of a fence and the means to affix the U-shaped latch to the vertical post of a fence are selected from: clamping means provided at an end of the U-shaped hook, a strap provided at an end of the U-shaped hook, and combinations thereof.

14. The apparatus of claim 8, wherein the U-shaped hooks and the U-shaped latch are made of a resilient material, and wherein the U-shaped hooks and the U-shaped latch are slightly smaller than the fence rail and post around which the U-shaped hooks hang and the U-shaped latch hook, thereby holding the apparatus tightly to the fence.

* * * * *